United States Patent
Ashley

(10) Patent No.: US 8,509,201 B2
(45) Date of Patent: Aug. 13, 2013

(54) WIRELESS NETWORKING SYSTEM AND METHOD

(75) Inventor: Alex Ashley, Redhill (GB)

(73) Assignee: Cisco Technology Inc., San Jose, CA (US)

( * ) Notice: Subject to any disclaimer, the term of this patent is extended or adjusted under 35 U.S.C. 154(b) by 817 days.

(21) Appl. No.: 12/448,379

(22) PCT Filed: Dec. 14, 2007

(86) PCT No.: PCT/GB2007/004830
§ 371 (c)(1),
(2), (4) Date: Aug. 17, 2009

(87) PCT Pub. No.: WO2008/084186
PCT Pub. Date: Jul. 17, 2008

(65) Prior Publication Data
US 2009/0303930 A1    Dec. 10, 2009

Related U.S. Application Data

(60) Provisional application No. 60/880,244, filed on Jan. 12, 2007, provisional application No. 60/879,946, filed on Jan. 11, 2007.

(51) Int. Cl.
*H04W 4/00* (2009.01)
(52) U.S. Cl.
USPC ........... 370/338; 370/322; 370/329; 370/348; 370/447; 370/461; 370/462; 455/456.4
(58) Field of Classification Search
USPC ............ 370/322, 328, 329, 338, 348, 445, 370/447, 462, 461; 455/456.4
See application file for complete search history.

(56) References Cited

U.S. PATENT DOCUMENTS

| | | | |
|---|---|---|---|
| 6,188,903 B1 | 2/2001 | Gardner et al. | |
| 7,349,366 B2 * | 3/2008 | de Heer et al. | 370/328 |
| 7,620,405 B2 * | 11/2009 | Soomro et al. | 455/456.4 |
| 7,920,545 B2 * | 4/2011 | Eguchi | 370/350 |
| 2003/0202498 A1 | 10/2003 | de Heer et al. | |

(Continued)

FOREIGN PATENT DOCUMENTS

| | | |
|---|---|---|
| CN | 1533200 A | 9/2004 |
| EP | 1 355 450 A1 | 10/2003 |

OTHER PUBLICATIONS

Written Opinion of International Searching Authority for corresponding International application PCT/GB2007/004830.

(Continued)

*Primary Examiner* — Christopher Grey
(74) *Attorney, Agent, or Firm* — Husch Blackwell LLP

(57) ABSTRACT

In a system comprising a first access point serving a first wireless network; and a neighboring access point serving a neighboring wireless network having coverage overlapping with the first wireless network, where the first access point and the neighboring access point transmit beacon messages at beacon times that are temporally separated by predetermined beacon periods, a method of operating the system is disclosed, the method comprising: the first access point sending a first offer to the neighboring access point, the first offer offering a period of silent time to the neighboring access point during which period of silent time the first access point silences the first wireless network, the period of silent time being independent of the beacon times and the beacon periods.

34 Claims, 5 Drawing Sheets

(56) References Cited

U.S. PATENT DOCUMENTS

| | | |
|---|---|---|
| 2004/0141522 A1 | 7/2004 | Texerman et al. |
| 2005/0191964 A1 | 9/2005 | Hundal |
| 2006/0140147 A1 | 6/2006 | Van Bemmel |
| 2007/0291681 A1* | 12/2007 | Jokela et al. ............... 370/328 |
| 2007/0297438 A1* | 12/2007 | Meylan et al. .............. 370/445 |

OTHER PUBLICATIONS

Alex Ashley et al., "The Challenges for Broadcast Television over Wireless In-Home Networks" (Paper submitted to International Broadcasting Convention Conference, Amsterdam, The Netherlands, Sep. 6, 2006).

Alex Ashley, "The Challenges for Broadcast Television over Wireless In-Home Networks" (Presentation given at the 3rd International Conference on "From IT to HD", part of the 2nd Multimedia Conference, Nov. 29-30, 2006, London, UK).

"IEEE Recommended Practice for Information technology—Telecommunications and information exchange between systems—local and metropolitan area networks—specific requirements—Part 11: Wireless LAN Medium Access Control (MAC) and Physical Layer (PHY) specifications," IEEE Std 802.11-2007 (Institute of Electrical and Electronic Engineers, Jun. 12, 2007).

"IEEE Recommended Practice for Information technology—Telecommunications and information exchange between systems—local and metropolitan area networks—specific requirements—Part 11: Wireless LAN Medium Access Control (MAC) and Physical Layer (PHY) specifications—Amendment 5: Spectrum and Transmit Power Management Extensions in the 5 GHz band in Europe," IEEE Standards, IEEE Std 802.11h-2003 (Institute of Electrical and Electronic Engineers, Oct. 14, 2003).

"IEEE Recommended Practice for Information technology—Telecommunications and information exchange between systems—local and metropolitan area networks—specific requirements—Part 15.2: Coexistence of Wireless Personal Area Networks with Other Wireless Devices operating in Unlicensed Frequency Bands," IEEE Standards, IEEE Std 802.15.2-2003 (Institute of Electrical and Electronic Engineers, Aug. 28, 2003).

"IEEE Standard for Information technology—Telecommunications and information exchange between systems—local and metropolitan area networks—specific requirements—Part 11: Wireless LAN Medium Access Control (MAC) and Physical Layer (PHY) specifications—Amendment 8: Medium Access Control (MAC) Quality of Service Enhancements," IEEE Std 802.11e-2005 (Institute of Electrical and Electronic Engineers, Nov. 11, 2005).

"Information technology—Telecommunications and information exchange between systems—local and metropolitan area networks—specific requirements—Part 11: Wireless LAN Medium Access Control (MAC) and Physical Layer (PHY) specifications," ANSI / IEEE Std 802.11, 1999 Edition (R2003), Jun. 12, 2003.

"Draft Standard for Information technology—Telecommunications and information exchange between systems—local and metropolitan area networks—Specific requirements—Part 11: Wireless LAN Medium Access Control (MAC) and Physical Layer (PHY) specifications," IEEE P802.11-REVma/D9.0 (IEEE, 2006).

"Draft Standard for Information technology—Telecommunications and information exchange between systems—LAN/MAN—Specific requirements—Part 11: Wireless Medium Access Control (MAC) and Physical Layer (PHY) specifications—Amendment v: Wireless Network Management," IEEE P802.11v/D0.06 (IEEE, Nov. 2006).

Roger Durand, "Spectrum Etiquette," IEEE 802.11-05/0906r0 (a presentation to IEEE 802.11 Working Group, Sep. 17, 2005).

Joe Epstein et al., "Access Point Coordination" (a presentation to IEEE 802.11 Working Group, May 2005).

* cited by examiner

WIRELESS NETWORKING SYSTEM AND METHOD

RELATED APPLICATION INFORMATION

The present application is a 35 USC §371 application of PCT/GB2007/004830, filed on 14 Dec. 2007 and entitled "Wireless Networking System and Method", which was published on 17 Jul. 2008 in the English language with International Publication Number WO 2008/084186 A1, and which relies for priority on U.S. Provisional Patent Application Ser. No. 60/879,946, filed on 11 Jan. 2007 and on U.S. Provisional Patent Application Ser. No. 60/880,244, filed on 12 Jan. 2007.

The present invention relates to a wireless networking system and method.

BACKGROUND OF THE INVENTION

The IEEE 802.11 family of specifications provides a method for wireless transmission of data between devices. The spectrum assignments in which IEEE 802.11 wireless networks can be used are a finite resource that is getting more congested as IEEE 802.11 becomes more popular.

The IEEE 802.11 standard is not well suited to the situation where two (or more) unrelated networks are within radio range of each other and use the same radio frequency (RF) channel. Two or more networks operating on the same RF channel within radio range of each other increases the probability of packet collisions.

One technique that has been suggested within the IEEE 802.11 standard to improve quality of service (QoS) is based on prioritising traffic, i.e. giving one of the networks prioritised access to the wireless medium.

IEEE 802.11 provides three channel access methods for providing QoS prioritised traffic.

The first method (called Enhanced Distributed Channel Access (EDCA)) modifies the time a station or access point waits between sensing that the wireless medium is not busy and starting to transmit. The waiting time is modified in such a way to make higher priority traffic more likely to be the first to be transmitted.

The second channel access method (called Point Coordination Function (PCF)) is based on an access point providing stations with contention free periods (CFP) in a period immediately following the transmission of a beacon frame from the access point. A polling mechanism is used where an access point grants a transmission opportunity to a station. All other stations remain silent during a CFP.

The third channel access method (called Hybrid Coordination Function Controlled Channel Access (HCCA)) is based on an access point providing stations with contention free periods. A polling mechanism is used where an access point grants a transmission opportunity to a station. All other stations remain silent during a CFP.

U.S. patent application Ser. No. 10/411,173 (published as US 2003/0202498) describes an access point for a wireless local area network. The access point is arranged to service its stations by using a Point Coordination Function (PCF) protocol and to monitor overlap with neighbouring access points. To mitigate overlap, the access point and overlapping neighbouring access points synchronise in such a way that the access point can service its stations in an overlap areas during a certain servicing time, while the overlapping neighbouring access points are silent, and vice versa. A silence trade-off mechanism is used to assure that overlapping access points get their fair share of available bandwidth.

The following document may be relevant to understanding the present invention: IEEE Std 802.11, 2007 Edition—Wireless LAN Medium Access Control (MAC) and Physical Layer (PHY) Specifications.

SUMMARY OF THE INVENTION

The EDCA system described above is negatively impacted by multiple unrelated networks within radio range of each other. It suffers from the problem that stations with packets of the same class (e.g. two stations with a packet of "voice" level priority) will have the same wait times. This effectively causes these prioritised packets to behave like best-effort traffic (traffic without a quality of service (QoS) guarantee, that is delivered as quickly as possible but with no guarantees of throughput or latency). Multiple unrelated networks within radio range of each other increase the chances of multiple packets of the same class being ready for transmission at the same time.

The PCF and HCCA systems described above are also negatively impacted by multiple unrelated networks within radio range of each other. These systems fail to provide a CFP if another network is nearby because the AP in the nearby network will not have scheduled a silence and may cause packet collisions.

U.S. patent application Ser. No. 10/411,173 mentioned above uses an iterative algorithm to negotiate an agreement of a time schedule which is then adhered to. This requires all the access points in the negotiation to use the same scheduling algorithm or else the iteration would not converge. Moreover, the Point Coordination Function (PCF) is used to control access to the wireless medium. Consequently, the servicing times when overlapping access points have to remain silent must be synchronised with the times and periods of beacon messages sent out by the access point since a PCF period can only be started at a whole number of beacon intervals.

According to embodiments of the present invention, in a system including a first access point serving a first wireless network; and a neighbouring access point serving a neighbouring wireless network having coverage overlapping with the first wireless network, wherein the first access point and the neighbouring access point transmit beacon messages at beacon times that are temporally separated by predetermined beacon periods, there is provided a method of operating the system, the method including: the first access point sending a first offer to the neighbouring access point, the first offer offering a period of silent time to the neighbouring access point during which period of silent time the first access point silences the first wireless network, wherein the period of silent time is independent of the beacon times and the beacon periods.

Preferably, the method further includes: the neighbouring access point sending an acceptance of the first offer to the first access point; the first access point receiving the acceptance; and the first access point silencing the first wireless network.

Preferably, the first access point silencing the first wireless network includes the first access point silencing the first wireless network for the duration of the period of silent time.

Alternatively, the method further includes: the neighbouring access point sending an acceptance of the first offer to the first access point; the first access point receiving the acceptance; and the first access point not honouring the first offer by not silencing the first wireless network.

Preferably, the method further includes: the neighbouring access point detecting that the first access point is not honouring the first offer.

Preferably, the detecting includes the neighbouring access point detecting data being transmitted by and/or destined for the first access point.

Preferably, the detecting includes the neighbouring access point detecting that the first access point is not sending out instructions to cause the first wireless network to become silent.

Preferably, the method further includes: the neighbouring access point sending a reciprocal offer to the first access point, the reciprocal offer offering a reciprocal period of silent time during which silent time the neighbouring access point silences the neighbouring wireless network.

Preferably, the neighbouring access point sends the reciprocal offer to the first access point only if the first access point honours the first offer by silencing the first wireless network.

Preferably, the neighbouring access point sends the reciprocal offer to the first access point even if the first access point does not honour the first offer.

Preferably, the method further includes: the neighbouring access point ignoring failure of the first access point to honour the first offer before sending the reciprocal offer to the first access point.

Preferably, the neighbouring access point arbitrarily ignores the failure of the first access point to honour the first offer.

Preferably, the method further includes: the first access point sending an acceptance of the reciprocal offer to the neighbouring access point; the neighbouring access point receiving the acceptance; and the neighbouring access point silencing the neighbouring wireless network.

Preferably, the neighbouring access point silencing the neighbouring wireless network includes the neighbouring access point silencing the neighbouring wireless network for the duration of the reciprocal period of silent time.

Alternatively, the method further includes: the first access point sending an acceptance of the reciprocal offer to the neighbouring access point; the neighbouring access point receiving the acceptance; and the neighbouring access point not honouring the reciprocal offer by not silencing the neighbouring wireless network.

Preferably, the method further includes: the first access point detecting that the neighbouring access point is not honouring the reciprocal offer.

Preferably, the detecting includes the first access point detecting data being transmitted by and/or destined for the neighbouring access point.

Preferably, the detecting includes the first access point detecting that the neighbouring access point is not sending out instructions to cause the neighbouring wireless network to become silent.

Preferably, the method further includes: the first access point sending an additional offer to the neighbouring access point, the additional offer offering an additional period of silent time during which silent time the first access point silences the first wireless network.

Preferably, the first access point sends the additional offer to the neighbouring access point only if the neighbouring access point honours the reciprocal offer by silencing the neighbouring wireless network.

Preferably, the first access point sends the additional offer to the neighbouring access point even if the neighbouring access point does not honour the reciprocal offer.

Preferably, the method further includes: the first access point ignoring failure of the neighbouring access point to honour the reciprocal offer before sending the additional offer to the neighbouring access point.

Preferably, the first access point arbitrarily ignores the failure of the neighbouring access point to honour the reciprocal offer.

Preferably, the method further includes: the first access point sending an additional offer to the neighbouring access point, the additional offer offering an additional period of silent time during which silent time the first access point silences the first wireless network.

Preferably, the method further includes: the neighbouring access point sending an acceptance of the additional offer to the first access point; the first access point receiving the acceptance; and the first access point silencing the first wireless network.

Preferably, the first access point silencing the first wireless network includes the first access point silencing the first wireless network for the duration of the additional period of silent time.

Alternatively, the method further includes: the neighbouring access point sending an acceptance of the additional offer to the first access point; the first access point receiving the acceptance; and the first access point not honouring the additional offer by not silencing the first wireless network.

Preferably, the method further includes: the neighbouring access point detecting that the first access point is not honouring the additional offer.

Preferably, the detecting includes the neighbouring access point detecting data being transmitted by and/or destined for the first access point.

Preferably, the detecting includes the neighbouring access point detecting that the first access point is not sending out instructions to cause the first wireless network to become silent.

Preferably, the method further includes: the neighbouring access point sending an additional reciprocal offer to the first access point, the additional reciprocal offer offering an additional reciprocal period of silent time during which silent time the neighbouring access point silences the neighbouring wireless network.

Preferably, the neighbouring access point sends the additional reciprocal offer to the first access point only if the first access point honours the additional offer by silencing the first wireless network.

Preferably, the neighbouring access point sends the additional reciprocal offer to the first access point even if the first access point does not honour the additional offer.

Preferably, the method further includes: the neighbouring access point ignoring failure of the first access point to honour the additional offer before sending the additional reciprocal offer to the first access point.

Preferably, the neighbouring access point arbitrarily ignores the failure of the first access point to honour the additional offer.

Preferably, the method further includes: the neighbouring access point sending an additional reciprocal offer to the first access point, the additional reciprocal offer offering an additional reciprocal period of silent time during which silent time the neighbouring access point silences the neighbouring wireless network.

According to further embodiments of the present invention, there is provided a system including: a first wireless network; a first access point serving the first wireless network; a neighbouring wireless network having coverage overlapping with the first wireless network; and a neighbouring access point serving the neighbouring wireless network, wherein the first access point and the neighbouring access point are operable to transmit beacon messages at beacon times that are temporally separated by predetermined beacon periods, and the first access point is operable to send a first offer to the neighbouring access point, the first offer offering a period of silent time to the neighbouring access point during which period of silent time the first access point silences the first wireless network, wherein the period of silent time is independent of the beacon times and the beacon periods.

According to yet further embodiments of the present invention, there is provided an access point serving a first wireless network, the first wireless network having coverage overlapping with a neighbouring wireless network, the neighbouring wireless network being served by a neighbouring access point, wherein the access point and the neighbouring access point are operable to transmit beacon messages at beacon times that are temporally separated by predetermined beacon periods, and the access point is operable to send a first offer to the neighbouring access point, the first offer offering a period of silent time to the neighbouring access point during which period of silent time the access point silences the first wireless network, wherein the period of silent time is independent of the beacon times and the beacon periods.

The present invention, in embodiments thereof, allows access points in wireless communications networks that are not controlled by one central management entity and are within radio range of each other to collaborate their usage of a radio frequency (RF) channel by sharing time on the wireless medium. This allows one of the networks to grant a slice of time to another network during which the first network will remain silent. The recipient network can then use this silent time for its traffic without collisions from the other network.

In certain embodiments of the present invention, the system is a collaborative system whereby a network that benefits from silent time repays the gift by reciprocating with its own offer of silence. An AP can advertise that it supports collaboration and can choose to offer silent time to another AP that is also known to support collaboration. If the offer is accepted, the AP can choose to silence its basic service set (BSS) for a period of time that was specified in the offer. However, an AP can also choose to "defect", i.e. an AP offering silence can choose not to honour its offer or an AP does not have to repay the sacrifice made by the offering AP.

In certain embodiments of the present invention, a "tit-for-tat" algorithm is used where collaboration is rewarded by reciprocation and defection is punished by non-collaboration. For example, a rogue AP that always accepts offers but never reciprocates may stop receiving offers.

The present invention, in certain embodiments thereof, is compatible with legacy equipment; does not reduce the robustness of networks to rogue equipment; and works across network boundaries (including networks not controlled by one central management entity.

The present invention, in certain embodiments thereof, allows and rewards collaboration but does not provide a new attack vector for a denial of service attack.

The present invention, in certain embodiments thereof, enhances QoS by allowing collaborating APs to avoid allocating overlapping contention free periods.

The present invention, in certain embodiments thereof, optimises time on an RF channel to remove/reduce the chance of collisions with traffic from other networks. QoS can therefore be improved.

The present invention, in certain embodiments thereof, reduces collisions and back-offs that could cause total throughput to fall below a required level.

The present invention, in certain embodiments thereof, is able to establish periods of silence that are independent of the timings and periods of beacon messages sent out by access points. Thus the silencing of networks is not tied to any particular channel access mode and is therefore independent of the channel access mode operated by the networks.

The present invention, in certain embodiments thereof, does not require all the access points to share the same scheduling algorithm. Moreover, there is no requirement of a fixed schedule that has to be adhered to. This is advantageous since the future demands on the network may not be known in advance.

The present invention, in certain embodiments thereof, does not involve the negotiation of a permanent allocation of time. Rather, periods of silence are determined on a round by round basis. Therefore, the timing and duration of the periods of silence can advantageously adapt to the changing load and radio conditions of the network. Moreover, the simplistic and dynamic nature of the determination of the periods of silence is beneficial especially when the network is heavily loaded and overheads need to be minimised. The timing and duration of the periods of silence can also adapt to the changing loads on the networks.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Embodiments of the present invention will now be described in relation to IEEE 802.11 conformant wireless networks. However, someone skilled in the art will realise that the invention is equally applicable to other wireless communication networks.

Some terminology relating to IEEE 802.11 conformant networks and used in the description that follows will now be given:

A station (STA) is a device that contains an IEEE 802.11-conformant medium access control (MAC) and physical layer (PHY) interface to the wireless medium (WM), e.g. a WiFi network card installed in a personal computer.

An access point (AP) is an entity that has station functionality, provides a coordination function and also provides access to distribution services, via the wireless medium (WM) for associated stations.

A basic service set (BSS) is the basic building block of an IEEE 802.11 network and comprises a set of stations controlled by a single coordination function.

Figure 1:
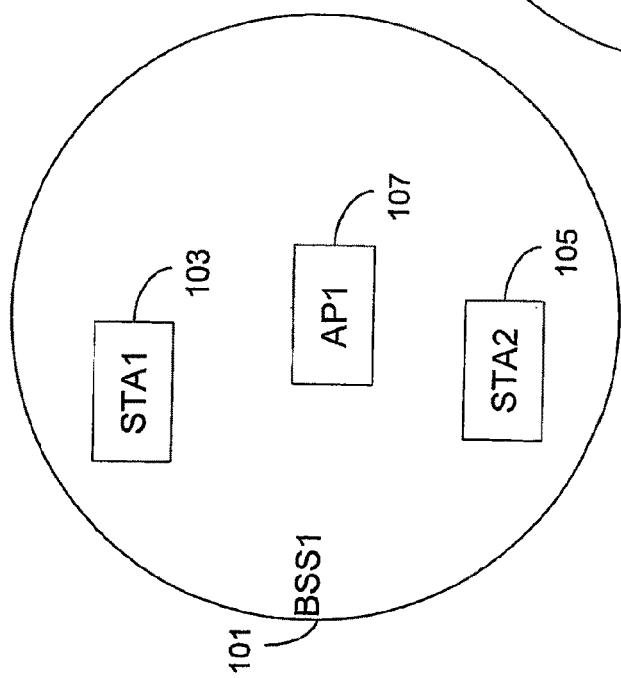
FIG. 1 is a simplified pictorial illustration of a wireless communications network.

Reference is now made to FIG. 1 which shows an IEEE 802.11-conformant wireless network comprising BSS1 101, which has two stations—STA1 103 and STA2 105—and an access point AP1 107. In FIG. 1, BSS1 101 is marked by a circular line which schematically depicts the coverage area of BSS1 within which the member stations of BSS1 101 may remain in communication.

Figure 2:
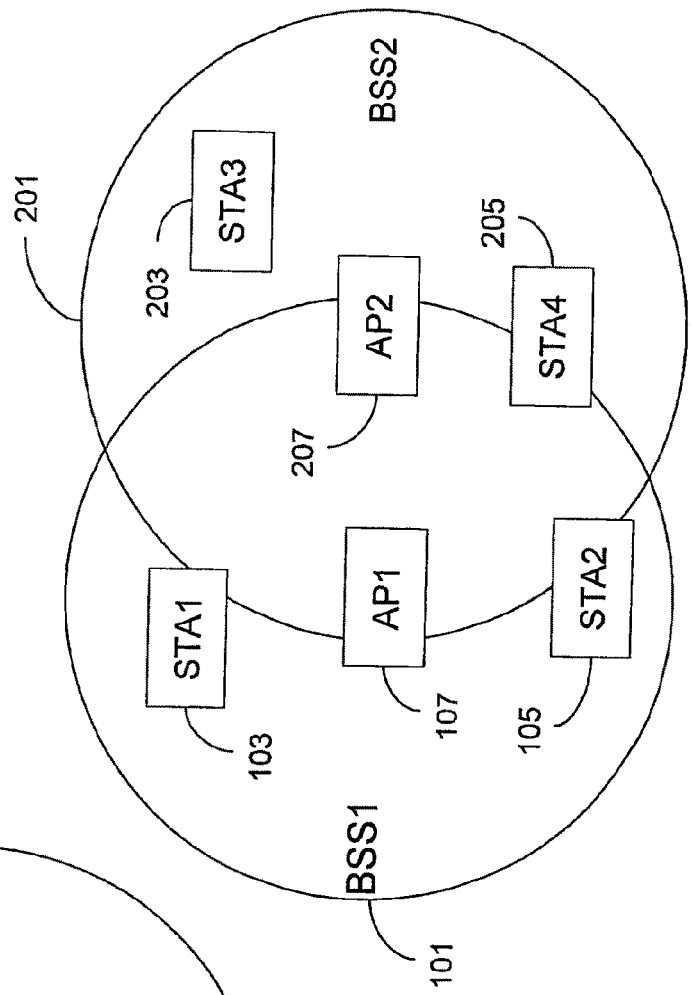
FIG. 2 is a simplified pictorial illustration of two wireless communication networks.

Reference is now made to FIG. 2, which shows the wireless network of FIG. 1 (including BSS1 101, STA1 103, STA2 105 and AP1 107) and additionally shows a further, unrelated IEEE 802.11-conformant wireless network comprising BSS2 201, whose coverage area is shown as overlapping with the coverage area of BSS1 101. BSS2 comprises two stations—STA3 203 and STA4 205—and an access point AP2 207.

The coverage areas of the two wireless networks shown in FIG. 2 overlap such that:
Radio emissions from AP1 107 in BSS1 101 are detectable by AP2 207 in BSS2 201;
Radio emissions from AP2 207 in BSS2 201 are detectable by AP1 107 in BSS1 101;
Radio emissions from STA1 103 and STA2 105 in BSS1 101 are detectable by AP2 207 in BSS2 201;
Radio emissions from AP2 207 in BSS2 201 are detectable by STA1 103 and STA2 105 in BSS1 101;
Radio emissions from STA4 205 in BSS2 201 are detectable by AP1 107 in BSS1 101; and
Radio emissions from AP1 107 in BSS1 101 are detectable by STA4 205 in BSS2 201.

It is to be noted that radio emissions from STA3 203 in BSS2 201 would not be detectable by AP1 107 in BSS1 101, and radio emissions from AP1 107 in BSS1 101 would not be detectable by STA3 203 in BSS 201 since STA3 203 does not lie within the coverage area of BSS1 101.

According to certain embodiments of the present invention, the two wireless networks are assumed to share the same radio frequency (RF) channel and therefore data packet collisions may occur.

According to certain embodiments of the present invention, two (or more) APs that are within radio range of each other (and that are using the same RF channel) are able to collaborate with each other in order to share time on the shared RF channel.

Referring to FIG. 2, the first step of a collaboration process according to the present embodiment between APs comprises APs advertising that they support collaboration. This is done by adding some extra information to the management frame of subtype "beacon" (sent by an AP to announce its presence and described in section 7.2.3.1 of IEEE 802.11, 2007 Edition as mentioned previously) that APs send regularly and/or by adding this same information to a management frame of subtype "probe response".

APs define the timing for the entire BSS by transmitting beacons according to the BeaconPeriod attribute within the AP. This defines a series of target beacon transmission times (TBTT) exactly a BeaconPeriod time units apart. At each TBTT, the AP schedules a beacon as the next frame for transmission. The beacon period is included in beacon and probe response frames, and STAs adopt that beacon period when joining the BSS.

According to embodiments of the present invention, the extra information that is added to beacon frames and probe response frames is called an AP Collaboration information element (E). [In IEEE 802.11 specifications, an Information Element (IE) is a key-length-value structure that is used to encapsulate an item of information. All IEs have the same basic structure, described in section 7.3.2 of IEEE 802.11, 2007 Edition as mentioned previously.]

The AP Collaboration IE defines information about the inter-AP collaboration features supported by the AP. A particular example of the format of the AP Collaboration element is shown below:

|  | Element ID | Length | AP Collaboration Capabilities |
|---|---|---|---|
| Octets: | 1 | 1 | 1 |

The Element ID (used to define the type of information element) is set to a new value added to the previously specified values in table 7-26 of section 7.3.2 of IEEE 802.11, 2007 Edition as mentioned previously or is set to a vendor proprietary extension value. The length field (used to specify how many octets occur in the element contents field) is set to one. A particular example of the format of the AP Collaboration Capabilities field (the element contents field of the AP Collaboration IE), which is one octet long (i.e. eight bits long), is shown below:

| Bit | Capability | Description |
|---|---|---|
| 0 | Time Collaboration | AP supports CFP Offer action |
| 1-7 | Reserved | |

The Time Collaboration capability (bit 0) is set to true (i.e. the bit is set to 1) if the AP supports sharing of time on the wireless medium and supports the contention free period (CFP) Offer action (described below). Otherwise, this capability bit is set to false (i.e. the bit is set to 0).

An AP can choose to offer silent time (a contention free period) to another AP that has advertised its support for collaboration. An offer is made by transmitting a CFP Offer action frame to a recipient AP that supports collaboration. Action frames have a common structure (described in section 7.2.3.12 of IEEE 802.11-2007) that contains two octets to indicate the action (the category and action fields) followed by a number of IEs. A particular example of the structure of a CFP Offer frame is shown below:

| Order | Information |
|---|---|
| 1 | Category |
| 2 | Action |
| 3 | Quiet |

The Category field value is set to 1, which indicates that the CFP Offer frame is a QoS action frame, as described in table 7-24 of section 7.3.1.11 of IEEE 802.11-2007 as mentioned previously.

The Action field value is set to 4, which indicates that the action is a CFP Offer. An action field value of 4 is a new action field value added to the previous action field values as described in table 7-45 of section 7.4.2 of IEEE 802.11-2007 as mentioned previously.

The Quiet field comprises a Quiet IE, which is used to define an interval during which no transmission shall occur in the current RF channel. Hence the Quiet field contains the time period that is being offered during which the AP will be silent. The silent period is not related to the beacon timing. In other words, it is independent of any beacon times (TBTTs) and beacon periods. The format of the Quiet IE is described in section 7.3.2.23 of IEEE 802.11-2007 as mentioned previously.

An AP that supports collaboration responds to a CFP Offer frame with a CFP Offer Response frame. This response contains a copy of the offer and the decision by the recipient AP to accept or reject this offer. A particular example of the structure of a CFP Offer Response frame is shown below:

| Order | Information |
|-------|-------------|
| 1 | Category |
| 2 | Action |
| 3 | Quiet |
| 4 | Status Code |

The Category field value is set to 1, which indicates that the CFP Offer frame is a QoS action frame, as described in table 7-24 of section 7.3.1.11 of IEEE 802.11-2007 as mentioned previously.

The Action field value is set to 5, which indicates that the action is a CFP Offer Response. An action field value of 5 is a new action field value added to the previous action field values as described in table 7-45 of section 7.4.2 of IEEE 802.11-2007 as mentioned previously.

The Quiet field contains a copy of the Quiet IE received in the CFP Offer frame.

The Status Code field contains the response to the time period that was offered and is set to one of the values defined in table 7-22 of section 7.3.1.9 of IEEE 802.11, 2007 Edition as mentioned previously. In the present embodiment, and as a non-limiting example, the status code contains one of the following values: 0; 37; 38; or 1, which correspond to the following responses: SUCCESS (i.e. offer accepted); REQUEST DENIED (i.e. offer declined); INVALID PARAMETERS; or UNSPECIFIED FAILURE.

If the offer is accepted, the AP that made the offer attempts to silence the BSS for the quiet interval specified in the offer. In the present embodiment, a Quiet IE is included in a beacon frame that is transmitted by the AP that is silencing its BSS. It should be noted that even though the Quiet IE is carried in the beacon frame, the period of silence is not related to the beacon timing. Moreover, multiple Quiet IEs can be carried in a single beacon frame.

In alternative embodiments, if there are stations associated to the access point that do not support the Quiet IE, the AP employs an alternative method to silence the BSS by transmitting a frame of type "CF-Poll (no data)". The CF-Poll bit is used in a frame sent by an AP to a station to poll that station in order to see if it wants to transmit any frames. A CF-Poll (no data) frame is a frame with the CF-Poll bit set but with no data payload. The "CF-Poll (no data)" frame is further described in section 7.1 of IEEE 802.11-2007, as mentioned previously. Preceding the start of the quiet interval (the start of the quiet interval minus the time required to transmit the CF-Poll frame), the access point schedules a frame of type "CF-Poll (no data)" with the Recipient Address field set to the AP's own MAC address and the duration/ID field set to the duration of the quiet interval. Preferably, the "CF-Poll (no data)" frame is transmitted at one of the physical layer modulation and encoding schemes supported by all associated stations, as described in 802.11-2007 in sections 12 to 19. The "CF-Poll (no data)" frame sets a timer in the stations called the NAV, which activates the virtual carrier sense system of the station, as described in section 9.2.1 in 802.11-2007. A station having an active carrier sense cannot transmit frames and the desire to silence the BSS is achieved.

It will be appreciated that other methods of silencing a BSS will be apparent to someone skilled in the art.

Figure 3:
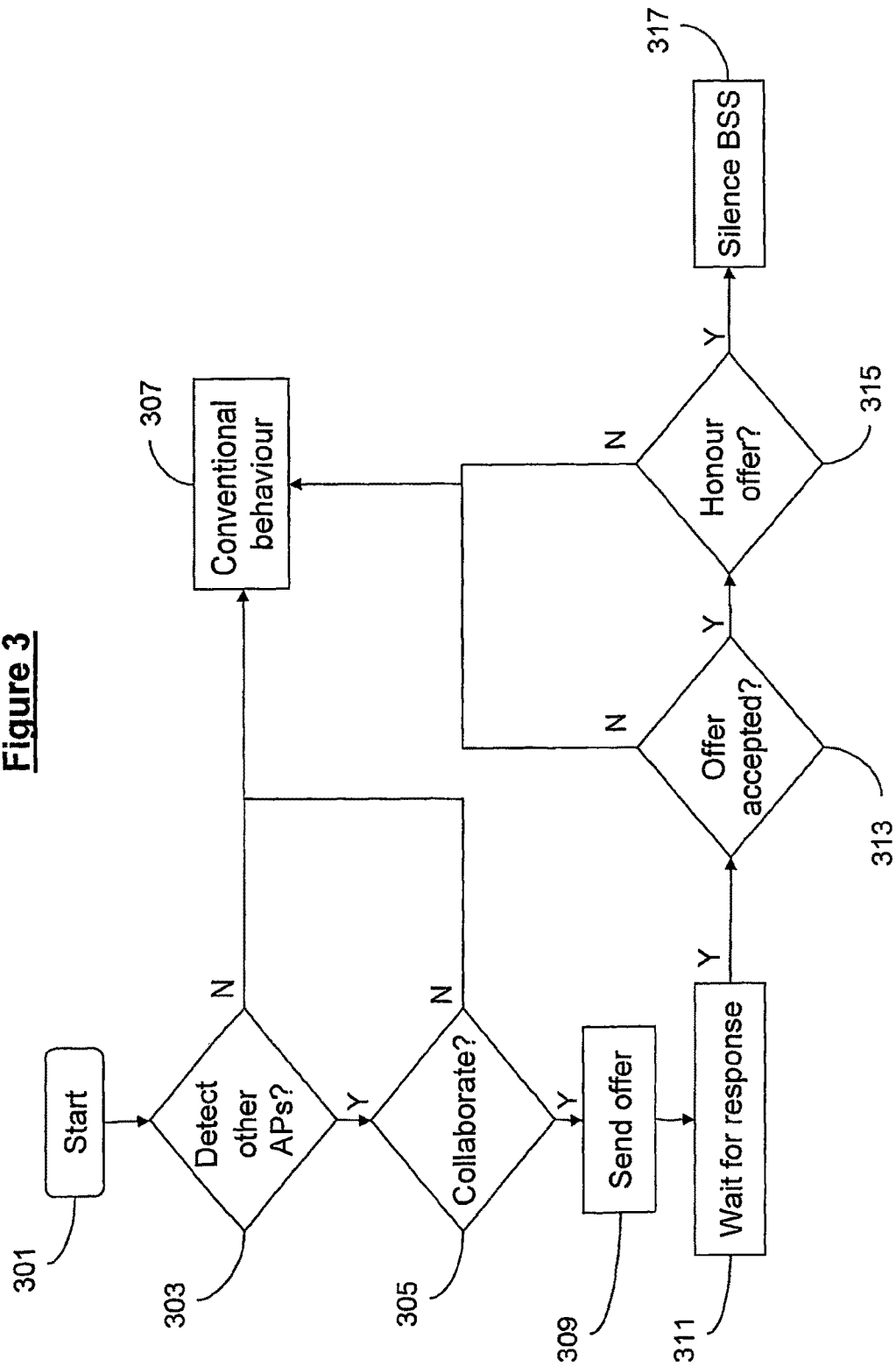
FIG. 3 is a simplified flow chart illustration of a method of access point collaboration according to an embodiment of the present invention.

With reference to FIG. 3, a method by which AP1 107 decides if it wishes to make a collaboration offer to another AP and by which any collaboration offer is made will now be described.

Starting from step 301, it is assumed that AP1 107 has been active on a particular RF channel for a sufficient period of time to have received beacons from any other AP within radio range operating on the same RF channel. For example beacons are typically transmitted every 100 ms, therefore AP1 107 is likely to have received beacons from nearby APs within a second. In the present embodiment, AP1 107 receives a beacon from AP2 207.

When each new beacon is received, AP1 checks the contents of the beacon to see if the AP from which the beacon was received supports collaboration (step 303). In the present embodiment, AP1 107 checks the contents of the beacon received from AP2 207 (more specifically, AP1 107 checks the time collaboration capability bit of the AP collaboration IE that was included in the beacon) and sees that AP2 207 supports collaboration.

If AP1 107 does detect an AP that supports collaboration (as in the present embodiment), AP1 107 then decides whether or not to make an offer of a silent period of time to that AP (step 305). This decision is based on factors such as the current load being experienced on the RF channel and the previous history of receiving collaboration offers from another AP. For example, if the network is heavily loaded and there is little or no spare time, AP1 107 may decide not to make an offer of a silent period of time.

If, on the other hand, none of the APs from which beacons were received support collaboration, AP1 107 services stations STA1 103 and STA2 105 according to the methods as described in the IEEE 802.11 standard (step 307).

It will be remembered that in the present embodiment, AP2 207 supports collaboration and hence AP1 107 decides whether or not to make an offer of a silent period of time to AP2 207.

If the decision made is to not make an offer, AP1 107 services stations STA1 103 and STA2 105 according to the methods as described in the IEEE 802.11 standard (step 307).

If, on the other hand, the decision made is to make an offer, AP1 107 sends a CFP Offer frame (with contents as previously described) to another AP (step 309)—to AP2 207 in the present embodiment.

AP1 107 then waits for the recipient AP (AP2 207 in the present embodiment) to reply to the offer (step 311).

On receiving the CFP Offer frame from AP1 107, AP2 207 decides whether to accept or decline the offer and responds to the offer by sending a CFP Offer Response frame back to AP1 107 (not shown).

AP1 107 inspects the contents of the CFP Offer Response frame to see if the offer has been accepted or declined (step 313).

If the offer has been declined, AP1 107 services stations STA1 103 and STA2 105 according to the methods as described in the IEEE 802.11 standard (step 307).

If the offer has been accepted, AP1 107 then decides whether or not to honour the offer of silence that it has made (step 315). Normally, AP1 107 would honour its offer. However there are situations where this may not be desirable, such as an unexpectedly high level of radio interference that has caused a backlog of traffic on the network.

If AP1 107 decides not to honour the offer, AP1 107 services stations STA1 103 and STA2 105 according to the methods as described in the IEEE 802.11 standard (step 307).

If, on the other hand, AP1 107 decides to honour the offer, AP1 107 silences BSS1 101 for the time period specified in the offer (step 317). Examples of methods to achieve this have been described previously. It should be noted that some methods of silencing BSS1 might not be perfect and that traffic might still occur on a network that has been silenced. An example of such an occurrence is a probe frame sent by a station when being switched on.

It will be noted from the above description that an AP can choose to "defect". For example, AP2 207 does not have to repay the sacrifice of AP1 107; or AP1 107 can choose not to honour its offer of silence. In another example of defection, AP1 107 may stop scheduling collaboration intervals or change the value of one or more of: the Quiet Period field, the Quiet Duration field, and the Quiet Offset field in Quiet IEs etc.

Failure to honour an offer of silence can be detected by numerous techniques. For example, the AP that accepted the offer of silence monitors the beacon frames from the offering AP to check that it has included one or more Quiet IE in its beacon that will cause its BSS to become silent during the offered quiet period. Another example is the AP that accepted the offer of silence monitors the wireless medium during the silence period. If the accepting AP detects packets going to or from the offering AP (e.g. by inspection of the source and destination addresses in the frame header), then the accepting AP knows that the offering AP must have defected from the offer. Other methods of detecting "defection" include measuring access delay or channel load, as these should both decrease if the other BSS is silent. Other methods will be apparent to someone skilled in the art.

If both AP1 107 and AP2 207 decided to collaborate (i.e. AP1 107 makes an offer to be silent, the offer is accepted by AP2 207, AP2 207 responds to AP1 107 with its own offer to be silent and AP1 107 accepts the offer) then both APs (AP1 107 and AP2 207) gain some time on the network while the other AP is silent.

However, if AP1 107 defects (e.g. does not honour the offer it makes to AP2 207), then AP1 107 will gain extra time on the network at the expense of AP2 207. If AP2 207 accepts the offer from AP1 (which honours its offer) and then decides to defect (e.g. by not responding to AP1 107 with its own offer of silence), then AP2 207 will gain extra time on the network at the expense of AP1 107.

In the present embodiment, no fixed rules are specified for when an AP should make a CFP Offer or when it should accept or reject an offer. Preferably, a collaboration algorithm that rewards an AP for providing CFP Offers by reciprocation is used, e.g. a "tit-for-tat" algorithm, where an AP makes an initial offer of silence and then only ever makes further offers if it receives an Offer from another AP.

A "tit-for-tat" collaboration algorithm is based on successive rounds of decision making (i.e. successive rounds of collaboration) by APs that are taking part. In every round, a binary decision to collaborate or defect is made by each AP involved in the collaboration. One round of collaboration comprises AP1 107 making an offer to AP2 207; AP1 107 either collaborating or defecting (by honouring or not honouring such an offer); AP2 either collaborating or defecting (by making an offer to AP1 or not making such an offer or not honouring such an offer). The outcome of each round depends on the choices made by each AP. Preferably, an AP is configured to adopt the behaviour adopted by the AP with which it is collaborating in the previous round of collaboration. In such cases, the table below shows the strategy that the APs adopt in two successive rounds of collaboration—round n and round n+1:

| Round n | | Round n + 1 | |
| --- | --- | --- | --- |
| AP1 | AP2 | AP1 | AP2 |
| Collaborate | Collaborate | Collaborate | Collaborate |
| Collaborate | Defect | Defect | Collaborate |
| Defect | Collaborate | Collaborate | Defect |
| Defect | Defect | Defect | Defect |

Thus if AP2 107 defects in round n (e.g. by not responding with a reciprocal offer to an offer from AP1 107), AP1 107 will defect in round n+1 (by not making another offer or by making an offer and then not honouring the offer). If AP1 107 collaborates in round n (by making an offer to AP2 207 and honouring the offer), AP2 207 will collaborate in round n+1 (by responding to the offer from AP1 107 and collaboration by AP1 107 with a reciprocal offer which AP2 subsequently honours) and so on.

The outcomes for any one round of collaboration are summarised below:

| AP1 | AP2 | Outcome |
| --- | --- | --- |
| Collaborate | Collaborate | Both APs get some time on the network while the other one is silent |
| Collaborate | Defect | AP2 gains extra network time at the expense of AP1 |
| Defect | Collaborate | AP1 gains extra network time at the expense of AP2 |
| Defect | Defect | Both APs exhibit standard 802.11 behaviour |

Thus an AP that loses out in one round may choose to "defect" in the next round. This AP will then either gain back its lost time (if the other AP collaborates) or will adopt standard IEEE 802.11 behaviour.

If both APs (AP1 107 and AP2 207) both defect in any given round then AP1 107 and AP2 207 can get locked in an endless case of defection. Therefore in the present embodiment, both APs are preferably configured to always collaborate in the first round of collaboration.

Alternatively, a modified "tit-for-tat" algorithm can be used, e.g. "tit-for-two-tats" where two "defections" are required before retaliation and "tit-for-tat with forgiveness" where there is an arbitrary/random chance (e.g. 5%) that a "defection" will be ignored. In yet other embodiments of the present invention, APs may be configured not to check for the version of defection where an AP chooses not to honour an offer of silence. Other variations of the "tit-for-tat" algorithm and alternative schemes/rules for when an AP should make a CFP Offer, when it should accept/reject an offer, and when it should collaborate/defect will be apparent to someone skilled in the art.

Figure 4:
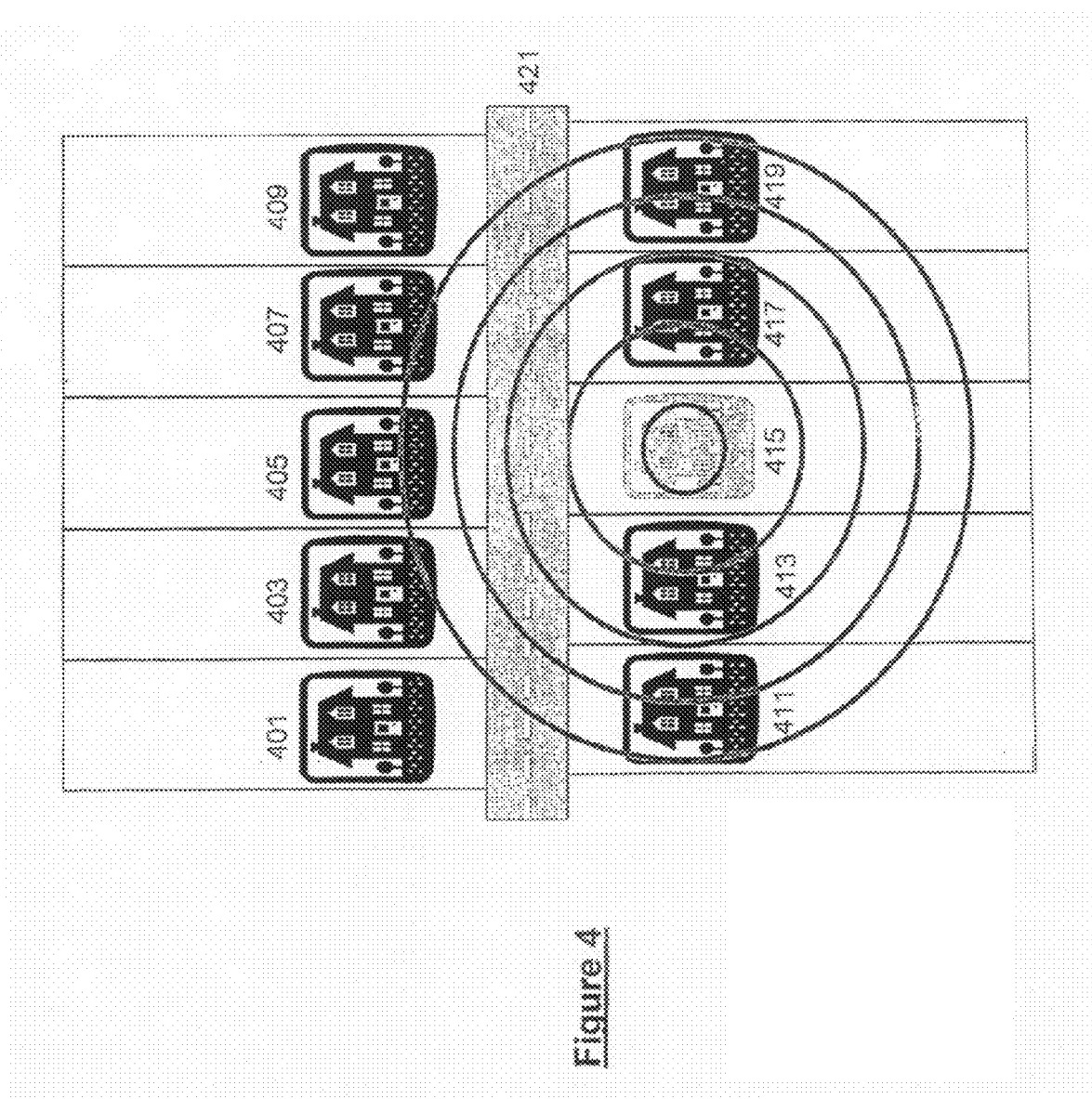
FIG. 4 is a simplified, pictorial illustration of a residential environment.

An example where access point collaboration is useful is in a residential environment such as the one shown in FIG. 4. Adjacent houses 401 to 419 on street 421 each have an AP and multiple stations (not shown). Radio emissions from an AP in house 415 are detectable in houses 403, 405, 407, 411, 413, 417 and 419. In certain situations there are an insufficient number of RF channels for each home 401 to 419 to have its own dedicated RF channel. In such a situation, two or more homes are forced to use the same RF channel.

By using AP collaboration, two homes are able to more efficiently make use of the spectrum by reducing the number of collisions (and the resultant back-off periods) on the shared RF channel. This increase of efficiency is important when there are only a small number of channels (e.g. IEEE 802.11 in the 2.4 GHz ISM band has only 3 non-overlapping channels) and when large amounts of traffic need to be passed over the network (e.g. streaming high definition video data).

In the above described embodiment, AP1 107 was described as silencing BSS1 101 in response to AP2 207 accepting the offer and AP1 deciding to honour the offer. In alternative embodiments, AP1 107 may be able to ascertain the location of STAs and other APs and therefore might choose to silence only certain stations rather than the entire BSS. This is useful in situations where some of the stations in the BSS may not be in radio range of the neighbouring BSS even though the AP of the BSS is in radio range.

Figure 5:
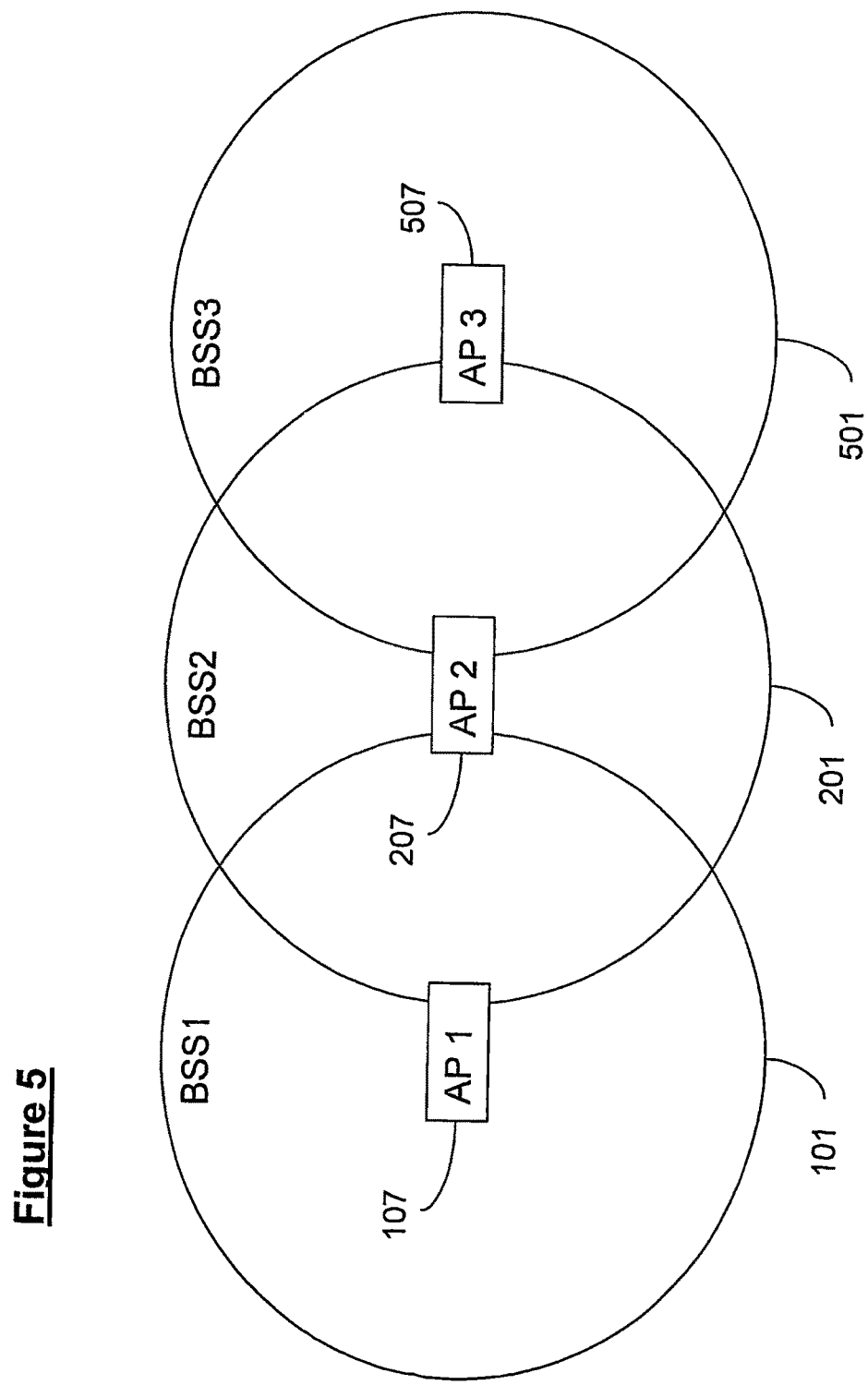
FIG. 5 is a simplified pictorial illustration of three wireless communication networks.

The above described embodiment can be also extended beyond two access points collaborating to a more general case of multiple access points in collaboration Referring to FIG. 5, in another embodiment, three networks are shown having overlapping coverage areas such that BSS1 101 and BSS2 201 have overlapping coverage areas, BSS2 201 and BSS3 501 have overlapping coverage areas, but BSS1 101 and BSS3 501 do not have overlapping coverage areas. In such an embodiment, AP2 207 can send a CFP Offer to both AP1 107 and AP3 507 containing an offer of the same period of time. The acceptance and decline mechanisms previously described will then be as previously described. If both AP1 107 and AP3 507 accept the offer and AP2 207 decides to honour the offer that it made to both AP1 107 and AP3 507, AP2 207 will silence BSS 201 and then AP1 107 and AP3 507 can both use the RF channel simultaneously without causing collisions with each other because they do not have overlapping coverage areas.

Figure 6:
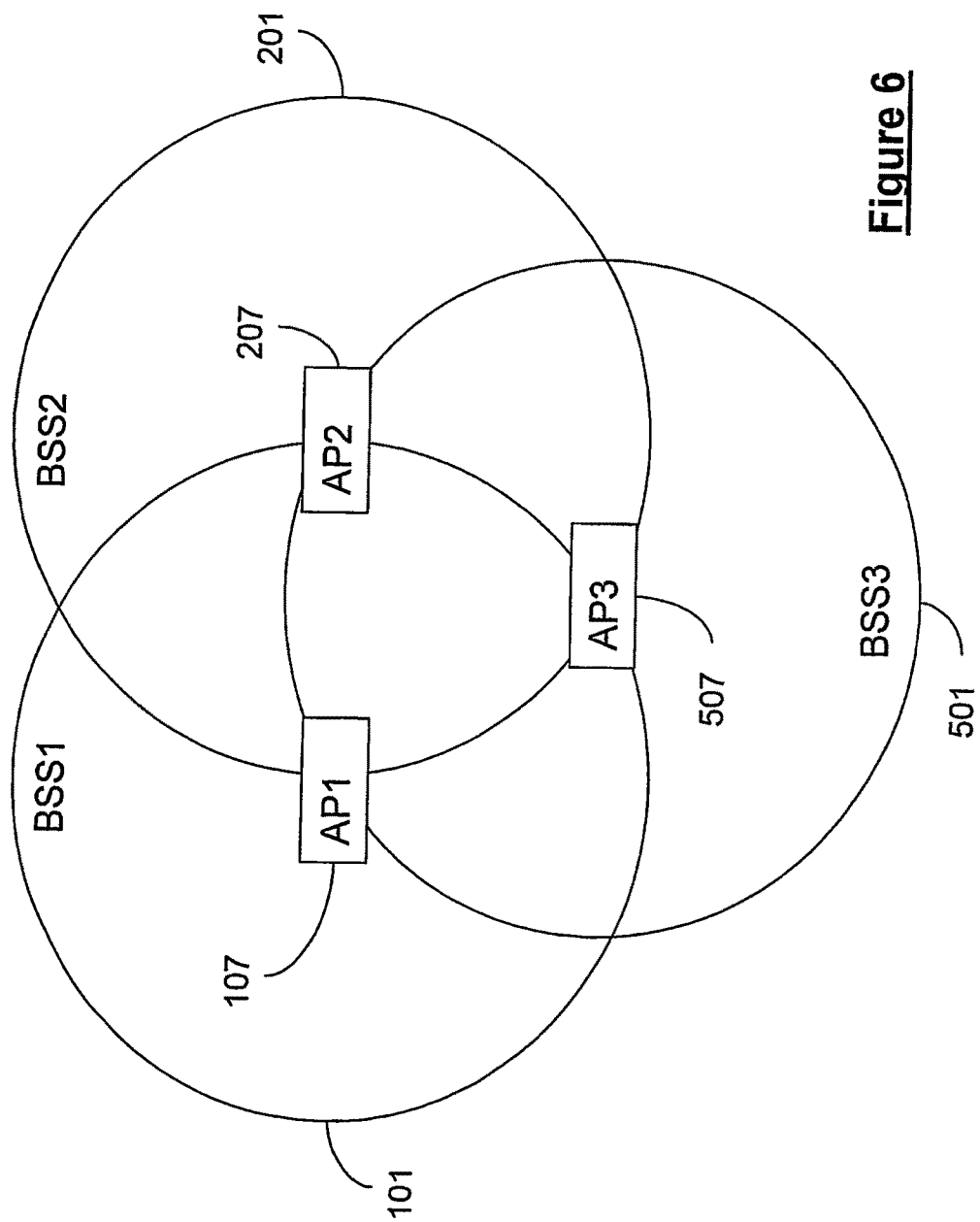
FIG. 6 is a simplified pictorial illustration of three wireless communication networks.

Referring now to FIG. 6, in another embodiment three networks are shown overlapping such that all three of the networks have overlapping coverage areas with each other. Following the same approach as described previously, AP2 207 sends identical offers to both AP1 107 and AP3 507. In this embodiment, if the offer is accepted and honoured, there is a chance that both AP1 107 and AP3 507 will consider this a "defection" from AP2 207 (for failing to honour its offer) because of collisions between BSS1 101 and BSS3 501. In such a situation, the collaboration system is likely to fall in to the "defection" case in each round of collaboration, causing a fall-back to standard IEEE 802.11 behaviour.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. In a system comprising a first access point serving a first wireless network; and a neighbouring access point serving a neighbouring wireless network having coverage overlapping with said first wireless network, wherein said first access point and said neighbouring access point transmit beacon messages at beacon times that are temporally separated by predetermined beacon periods, a method of operating said system, said method comprising:
   said first access point sending a first offer to said neighbouring access point, said first offer offering a period of silent time to said neighbouring access point during which period of silent time said first access point silences said first wireless network;
   said neighbouring access point sending an acceptance of said first offer to said first access point;
   said first access point receiving said acceptance; and
   said first access point not honouring said first offer by not silencing said first wireless network;
   wherein a specific point in time when said period of silent time could start and its duration are not limited by when said beacon times will occur and are not limited by a length of said beacon periods.

2. The method of claim 1, further comprising: said neighbouring access point detecting that said first access point is not honouring said first offer.

3. The method of claim 2, wherein said detecting comprises said neighbouring access point detecting data being transmitted by and/or destined for said first access point.

4. The method of claim 2, wherein said detecting comprises said neighbouring access point detecting that said first access point is not sending out instructions to cause said first wireless network to become silent.

5. In a system comprising a first access point serving a first wireless network; and a neighbouring access point serving a neighbouring wireless network having coverage overlapping with said first wireless network, wherein said first access point and said neighbouring access point transmit beacon messages at beacon times that are temporally separated by predetermined beacon periods, a method of operating said system, said method comprising:
   said first access point sending a first offer to said neighbouring access point, said first offer offering a period of silent time to said neighbouring access point during which period of silent time said first access point silences said first wireless network;
   said neighbouring access point sending an acceptance of said first offer to said first access point;
   said first access point receiving said acceptance;
   said first access point silencing said first wireless network; and
   said neighbouring access point sending a reciprocal offer to said first access point, said reciprocal offer offering a reciprocal period of silent time during which silent time said neighbouring access point silences said neighbouring wireless network;
   wherein a specific point in time when said period of silent time could start and its duration are not limited by when said beacon times will occur and are not limited by a length of said beacon periods.

6. The method of claim 5, wherein said neighbouring access point sends said reciprocal offer to said first access point only if said first access point honours said first offer by silencing said first wireless network.

7. The method of claim 5, wherein said neighbouring access point sends said reciprocal offer to said first access point even if said first access point does not honour said first offer.

8. The method of claim 5, further comprising:
said neighbouring access point ignoring failure of said first access point to honour said first offer before sending said reciprocal offer to said first access point.

9. The method of claim 8, wherein said neighbouring access point arbitrarily ignores said failure of said first access point to honour said first offer.

10. The method of claim 5, further comprising:
said first access point sending an acceptance of said reciprocal offer to said neighbouring access point;
said neighbouring access point receiving said acceptance; and
said neighbouring access point silencing said neighbouring wireless network.

11. The method of claim 10, wherein said neighbouring access point silencing said neighbouring wireless network comprises said neighbouring access point silencing said neighbouring wireless network for the duration of said reciprocal period of silent time.

12. The method of claim 5, further comprising:
said first access point sending an acceptance of said reciprocal offer to said neighbouring access point;
said neighbouring access point receiving said acceptance; and
said neighbouring access point not honouring said reciprocal offer by not silencing said neighbouring wireless network.

13. The method of claim 12, further comprising:
said first access point detecting that said neighbouring access point is not honouring said reciprocal offer.

14. The method of claim 13, wherein said detecting comprises said first access point detecting data being transmitted by and/or destined for said neighbouring access point.

15. The method of claim 13, wherein said detecting comprises said first access point detecting that said neighbouring access point is not sending out instructions to cause said neighbouring wireless network to become silent.

16. The method of claim 12, further comprising:
said first access point sending an additional offer to said neighbouring access point, said additional offer offering an additional period of silent time during which silent time said first access point silences said first wireless network.

17. The method of claim 16, wherein said first access point sends said additional offer to said neighbouring access point only if said neighbouring access point honours said reciprocal offer by silencing said neighbouring wireless network.

18. The method of claim 16, wherein said first access point sends said additional offer to said neighbouring access point even if said neighbouring access point does not honour said reciprocal offer.

19. The method of claim 12, further comprising:
said first access point ignoring failure of said neighbouring access point to honour said reciprocal offer before sending said additional offer to said neighbouring access point.

20. The method of claim 19, wherein said first access point arbitrarily ignores said failure of said neighbouring access point to honour said reciprocal offer.

21. The method of claim 16, further comprising:
said neighbouring access point sending an acceptance of said additional offer to said first access point;
said first access point receiving said acceptance; and
said first access point silencing said first wireless network.

22. The method of claim 21, wherein said first access point silencing said first wireless network comprises said first access point silencing said first wireless network for the duration of said additional period of silent time.

23. The method of claim 16, further comprising:
said neighbouring access point sending an acceptance of said additional offer to said first access point;
said first access point receiving said acceptance; and
said first access point not honouring said additional offer by not silencing said first wireless network.

24. The method of claim 23, further comprising: said neighbouring access point detecting that said first access point is not honouring said additional offer.

25. The method of claim 24, wherein said detecting comprises said neighbouring access point detecting data being transmitted by and/or destined for said first access point.

26. The method of claim 24, wherein said detecting comprises said neighbouring access point detecting that said first access point is not sending out instructions to cause said first wireless network to become silent.

27. The method of claim 21, further comprising:
said neighbouring access point sending an additional reciprocal offer to said first access point, said additional reciprocal offer offering an additional reciprocal period of silent time during which silent time said neighbouring access point silences said neighbouring wireless network.

28. The method of claim 27, wherein said neighbouring access point sends said additional reciprocal offer to said first access point only if said first access point honours said additional offer by silencing said first wireless network.

29. The method of claim 27, wherein said neighbouring access point sends said additional reciprocal offer to said first access point even if said first access point does not honour said additional offer.

30. The method of claim 27, further comprising:
said neighbouring access point ignoring failure of said first access point to honour said additional offer before sending said additional reciprocal offer to said first access point.

31. The method of claim 30, wherein said neighbouring access point arbitrarily ignores said failure of said first access point to honour said additional offer.

32. The method of claim 5, further comprising:
said neighbouring access point sending an additional reciprocal offer to said first access point, said additional reciprocal offer offering an additional reciprocal period of silent time during which silent time said neighbouring access point silences said neighbouring wireless network.

33. A system comprising:
a first wireless network;
a first access point serving said first wireless network;
a neighbouring wireless network having coverage overlapping with said first wireless network; and
a neighbouring access point serving said neighbouring wireless network,
wherein said first access point and said neighbouring access point are operable to transmit beacon messages at beacon times that are temporally separated by predetermined beacon periods,
said first access point is operable to send a first offer to said neighbouring access point, said first offer offering a period of silent time to said neighbouring access point during which period of silent time said first access point silences said first wireless network, wherein a specific point in time when said period of silent time could start and its duration are not limited by when said beacon times will occur and are not limited by a length of said beacon periods, said neighbouring access point is operable to send an acceptance of said first offer to said first access point, said first access point is operable to receive said acceptance and to silence said first wireless network, and said neighbouring access point is operable to send a reciprocal offer to said first access point, said reciprocal offer offering a reciprocal period of silent time during which silent time said neighbouring access point silences said neighbouring wireless network.

34. An access point serving a first wireless network, said first wireless network having coverage overlapping with a neighbouring wireless network, said neighbouring wireless network being served by a neighbouring access point, the access point comprising:

transmit/receive hardware; and a processor;

wherein the processor is operable:

(1) to transmit beacon messages via the transmit/receive hardware at beacon times that are temporally separated by predetermined beacon periods, (2) to receive, via the transmit/receive hardware, beacon messages from the neighboring access point at beacon times that are temporally separated by predetermined beacon periods, (3) to send a first offer to said neighbouring access point via the transmit/receive hardware, said first offer offering a period of silent time to said neighbouring access point during which period of silent time said access point silences said first wireless network, wherein a specific point in time when said period of silent time could start and its duration are not limited by when said beacon times will occur and are not limited by a length of said beacon periods, (4) to receive an acceptance of said first offer from said neighbouring access point via the transmit/receive hardware, (5) to silence said first wireless network, and (6) to receive a reciprocal offer from said neighbouring access point via the transmit/receive hardware, said reciprocal offer offering a reciprocal period of silent time during which silent time said neighbouring accesspoint silences said neighbouring wireless network.

* * * * *

UNITED STATES PATENT AND TRADEMARK OFFICE
CERTIFICATE OF CORRECTION

PATENT NO. : 8,509,201 B2  Page 1 of 1
APPLICATION NO. : 12/448379
DATED : August 13, 2013
INVENTOR(S) : Alex Ashley It is certified that error appears in the above-identified patent and that said Letters Patent is hereby corrected as shown below:

In the Specification

In column 7, line 59, delete "element (E)." and substitute therefor --element (IE).--;

In column 10, line 25, delete "RE channel" and substitute therefor --RF channel--;

In column 15, line 39 (first line of claim 16), delete "claim 12" and substitute therefor --claim 10--.

Signed and Sealed this
Second Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO.         : 8,509,201 B2                                               Page 1 of 1
APPLICATION NO. : 12/448379
DATED              : August 13, 2013
INVENTOR(S)        : Alex Ashley It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 972 days.

Signed and Sealed this

Fifteenth Day of September, 2015

Michelle K. Lee
*Director of the United States Patent and Trademark Office*